US011089537B2

(12) United States Patent
Hong

(10) Patent No.: US 11,089,537 B2
(45) Date of Patent: Aug. 10, 2021

(54) METHOD AND DEVICE FOR BROADCASTING SYSTEM INFORMATION FOR SUPPORTING NETWORK COMMUNICATION OF TERMINAL

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 41 days.

(21) Appl. No.: 16/446,794

(22) Filed: Jun. 20, 2019

(65) Prior Publication Data

US 2019/0306783 A1 Oct. 3, 2019

Related U.S. Application Data

(63) Continuation of application No. PCT/CN2016/111067, filed on Dec. 20, 2016.

(51) Int. Cl.
*H04W 48/10* (2009.01)
*H04W 48/12* (2009.01)
*H04W 4/12* (2009.01)

(52) U.S. Cl.
CPC ............ *H04W 48/10* (2013.01); *H04W 4/12* (2013.01); *H04W 48/12* (2013.01)

(58) Field of Classification Search
CPC ....... H04W 48/10; H04W 48/12; H04W 4/12; H04W 36/0055; H04W 72/14; H04W 74/0866; H04B 1/76
See application file for complete search history.

(56) References Cited

U.S. PATENT DOCUMENTS

2010/0022250 A1\* 1/2010 Petrovic ............... H04J 11/0093
455/450
2012/0309400 A1\* 12/2012 Inumaru ............... H04W 76/40
455/438
(Continued)

FOREIGN PATENT DOCUMENTS

CN      101212799 A     7/2008
CN      101227706 A     7/2008
(Continued)

OTHER PUBLICATIONS

International Search Report and Written Opinion of PCT Application No. PCT/CN2016/111067, dated May 27, 2017, issued by the ISA/CN—State Intellectual Property Office of the P.R. China.
First Office Action dated Mar. 8, 2019, in counterpart Chinese Application No. 201680001804.0 and English translation thereof.
(Continued)

*Primary Examiner* — Mewale A Ambaye
(74) *Attorney, Agent, or Firm* — Finnegan, Henderson, Farabow, Garrett & Dunner, L.L.P.

(57) ABSTRACT

A method for transmitting system information, includes: determining identifiers of a plurality of pieces of second system information from first system information, wherein the first system information is system information that is periodically broadcast by a base station, and the plurality of pieces of second system information are system information other than the system information included by the first system information; determining transmission status of the plurality of pieces of second system information based on the identifiers of the plurality of pieces of second system information; and broadcasting the first system information, wherein the first system information includes the identifiers and the transmission status of the plurality of pieces of second system information.

11 Claims, 8 Drawing Sheets

(56) References Cited

U.S. PATENT DOCUMENTS

| | | | |
|---|---|---|---|
| 2018/0317114 A1* | 11/2018 | Kim | H04L 1/1685 |
| 2019/0174398 A1 | 6/2019 | Geng et al. | |
| 2019/0306783 A1* | 10/2019 | Hong | H04W 48/12 |
| 2019/0357227 A1* | 11/2019 | Khirallah | H04L 49/25 |
| 2020/0045705 A1* | 2/2020 | Chae | H04W 48/12 |
| 2020/0220609 A1* | 7/2020 | Venugopal | H04B 7/088 |

FOREIGN PATENT DOCUMENTS

| | | |
|---|---|---|
| CN | 102118812 A | 7/2011 |
| CN | 102378129 A | 3/2012 |
| CN | 102754487 A | 10/2012 |
| CN | 102970729 A | 3/2013 |
| CN | 103067987 A | 4/2013 |
| CN | 105814961 A | 7/2016 |
| CN | 107708170 A | 2/2018 |
| EP | 1714448 A2 | 10/2006 |
| EP | 2 533 576 A1 | 12/2012 |
| EP | 2639981 A2 | 9/2013 |
| JP | 2010506445 A | 2/2010 |
| JP | 2019525616 A | 9/2019 |
| RU | 2429577 C2 | 9/2011 |
| RU | 2474962 C2 | 2/2013 |

OTHER PUBLICATIONS

Second Office Action dated May 23, 2019, in counterpart Chinese Application No. 201680001804.0 and English translation thereof.
CMCC: "Further considerations on minimum SI", 3GPP TSG-RAN WG2 Meeting #95bis, Kaohsiung, Oct. 10-14, 2016, 4 pgs.
Extended Search Report for European Application No. 16924440.7 from the European Patent Office, dated Nov. 21, 2019.
First Office Action of Russian Application No. 2019120975 dated Mar. 31, 2020.
Russian Search Report of Russian Application No. 2019120975 dated Mar. 31, 2020.
Japanese Search Report of Japanese Application No. 2019-531618 dated May 19, 2020.
Huawei, HiSilicon, Further Discussions of "*Minimum SI*", 3GPP TSG-RAN WG2 Meeting #95bis, R2-166202, Kaohsiung, Oct. 10-14, 2016, 3 pgs.
Huawei, HiSilicon, *Delivery of "Other SI" in NR*, 3GPP TSG-RAN2 Meeting #95bis, R2-166203, Kaohsiung, Oct. 10-14, 2016, 5 pgs.
Korean Notification of Reason for Refusal of Korean application No. 10-2019-7021176 dated Jul. 2, 2020.
Samsung, *Contents of Minimum System Information*, 3GPP TSG RAN WG2 Meeting #96, R2-168152, Reno, Nevada, Nov. 14-18, 2016, 4 pgs.

\* cited by examiner

METHOD AND DEVICE FOR BROADCASTING SYSTEM INFORMATION FOR SUPPORTING NETWORK COMMUNICATION OF TERMINAL

CROSS-REFERENCE TO RELATED APPLICATIONS

This application is a continuation of International Application No. PCT/CN2016/111067, filed Dec. 20, 2016, the entire contents of which are incorporated herein by reference.

TECHNICAL FIELD

The present disclosure relates to the field of communications technologies, and in particular, to a method and device for transmitting system information.

BACKGROUND

In a communication network, a base station generally needs to transmit system information to terminals within a management scope of the base station. This system information is for supporting network communications of the terminals. For example, the system information can include such information as cell resource information, cell re-selection information or TA (Timing Advance) lists.

Currently, 5G (The Fifth Generation Mobile Communication Technology) has developed rapidly. The system information in 5G communication network has been distinguished as Minimum SI (Minimum System Information) and Other SI (Other System Information) in RAN2# conference in August 2016. Wherein, the Minimum SI refers to the system information that needs to be periodically broadcast by the base station, and at least includes the cell resource information and identifier of the Other SI supported by the base station. The Other SI refers to the system information not broadcast in the Minimum SI. Namely, the Other SI refers to the system information other than the system information included by the Minimum SI. And the Other SI needs to be sent as required by the terminal.

SUMMARY

According to a first aspect of the present disclosure, a method for transmitting system information includes: determining identifiers of a plurality of pieces of second system information from first system information, wherein the first system information is system information that is periodically broadcast by a base station, and the plurality of pieces of second system information are system information other than the system information included by the first system information; determining transmission status of the plurality of pieces of second system information based on the identifiers of the plurality of pieces of second system information; and broadcasting the first system information, wherein the first system information includes the identifiers and the transmission status of the plurality of pieces of second system information.

According to a second aspect of the present disclosure, a method for transmitting system information includes: receiving first system information broadcast by a base station, wherein the first system information includes identifiers and transmission status of a plurality of pieces of second system information, wherein the first system information is system information that is periodically broadcast by the base station, and the plurality of pieces of second system information are system information other than the system information included by the first system information; acquiring a transmission status of target system information from the first system information based on an identifier of the target system information when the target system information needs to be acquired, wherein the target system information is one of the plurality of pieces of second system information; and when determining that the target system information is being transmitted based on the transmission status of the target system information, acquiring the target system information based on information that is being transmitted by the base station.

According to a third aspect of the present disclosure, a base station includes: a processor; and a memory storing an instruction executable by the processor, wherein the processor is configured to: determine identifiers of a plurality of pieces of second system information from first system information, wherein the first system information is system information that is periodically broadcast by the base station, and the plurality of pieces of second system information are system information other than the system information included by the first system information; determine transmission status of the plurality of pieces of second system information based on the identifiers of the plurality of pieces of second system information; and broadcast the first system information, wherein the first system information includes the identifiers and the transmission status of the plurality of pieces of second system information.

According to a fourth aspect of the present disclosure, a terminal includes: a processor; and a memory storing an instruction executable by the processor, wherein the processor is configured to: receive first system information broadcast by a base station, wherein the first system information includes identifiers and transmission status of a plurality of pieces of second system information, wherein the first system information is system information that is periodically broadcast by the base station, and the plurality of pieces of second system information are system information other than the system information included by the first system information; acquire a transmission status of target system information from the first system information based on an identifier of the target system information when the target system information needs to be acquired, wherein the target system information is one of the plurality of pieces of second system information; and when it is determined that the target system information is being transmitted based on the transmission status of the target system information, acquire the target system information based on information that is being transmitted by the base station.

It is to be understood that both the foregoing general description and the following detailed description are exemplary and explanatory only and are not restrictive of the present disclosure.

BRIEF DESCRIPTION OF THE DRAWINGS

The drawings herein, which are incorporated in and constitute a part of this specification, illustrate embodiments consistent with the present disclosure and explain the principles of the present disclosure together with the description.

DETAILED DESCRIPTION

Figure 1:
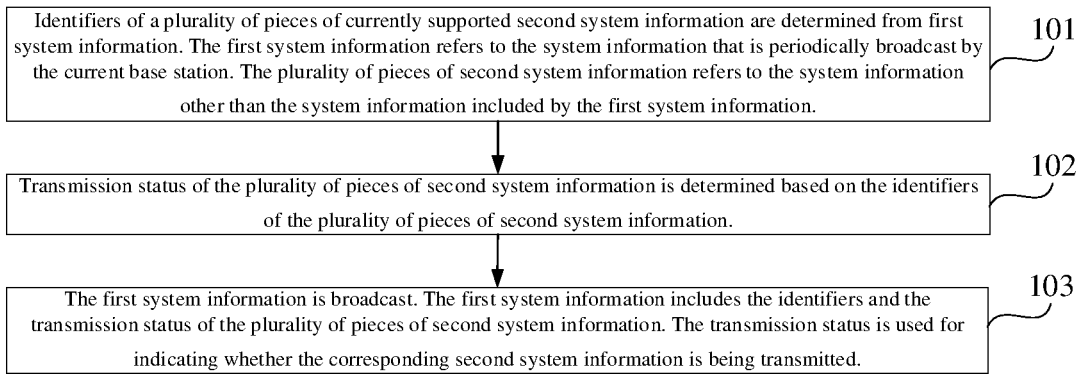
FIG. 1 is a flow chart of a method for transmitting system information according to an exemplary embodiment.

Hereinafter, exemplary embodiments will be described in detail. The embodiments are shown in the drawings. In the following description when referring to the drawings, the same numerals in the different drawings denote the same or similar elements unless otherwise indicated. The embodiments described in the following exemplary embodiments are not all embodiments consistent with the present disclosure. Rather, they are merely examples of devices and methods consistent with some aspects of the present disclosure as detailed in the appended claims.

Methods provided by the embodiments of the present disclosure may be applied to scenarios in which a base station transmits system information to a terminal. In a 5 G communication network, the system information is distinguished as Minimum SI and Other SI. The base station can periodically broadcast the Minimum SI, but transmit the Other SI as required by the terminal. For example, the terminal sends an acquisition request to the base station when needing to acquire some Other SI, and the base station may not send the Other SI to the terminal or broadcast the Other SI until it receives the acquisition request. Since in the related art, for each piece of Other SI, the terminal needs to send an acquisition request to the base station for acquisition, the efficiency of transmitting the system information is relatively lower. Besides, a heavy signaling load will be brought for the base station. In order to improve the efficiency of transmitting the system information and reduce the signaling load of the base station, an embodiment of the present disclosure provides a method for transmitting system information, described in detail as below.

FIG. 1 is a flow chart of a method for transmitting system information according to an exemplary embodiment. As shown in FIG. 1, the method is applied to a base station, and includes the following steps.

In step 101, identifiers of a plurality of pieces of currently supported second system information are determined from first system information. The first system information refers to the system information that is periodically broadcast by the current base station. The plurality of pieces of second system information refer to the system information other than the system information included by the first system information.

In step 102, transmission status of the plurality of pieces of second system information is determined based on the identifiers of the plurality of pieces of second system information.

In step 103, the first system information is broadcast. The first system information includes the identifiers and the transmission status of the plurality of pieces of second system information. The transmission status may be used for indicating whether the corresponding second system information is being transmitted. In one embodiment, the transmission status is used for indicating whether the corresponding second system information is being broadcast.

In the embodiment of the present disclosure, the base station can determine the identifiers of the plurality of pieces of currently supported second system information from the first system information, can still determine the transmission status of the plurality of pieces of second system information based on the identifiers of the plurality of pieces of second system information, and therefore, can broadcast the first system information that includes the identifiers and the transmission status of the plurality of pieces of second system information. The transmission status may be used for indicating whether the corresponding second system information is being transmitted. The first system information refers to the system information that is periodically broadcast by the base station. The second system information refers to the system information other than the system information included by the first system information. Since the first system information includes the transmission status of each piece of second system information, after receiving the first system information that is broadcast by the base station, a terminal can determine whether the second system information that needs to be acquired at present is being transmitted based on the first system information. If yes, the second system information can be directly acquired from the information that is being transmitted by the base station without sending an acquisition request to the base station and the base station does not need to repeatedly send the second system information. Thus, the efficiency of transmitting the system information is improved and the signaling load of the base station is reduced.

In one embodiment, the transmission status includes a first transmission status and a second transmission status. For example, the first transmission status is used for indicating that the corresponding second system information is being transmitted, and the second transmission status is used for indicating that the corresponding second system information is not being transmitted. Also for example, the first transmission status is used for indicating that the corresponding second system information is being broadcast, and the second transmission status is used for indicating that the corresponding second system information is not being broadcast.

In one embodiment, for each of the plurality of pieces of second system information, when the transmission status of the second system information is the first transmission status, the first system information further includes a transmission mode of the second system information. The transmission mode includes a broadcast mode or a unicast mode.

In one embodiment, for each of the plurality of pieces of second system information, when the transmission mode of the second system information is the broadcast mode, the first system information further includes a broadcast address of the second system information.

Any combination of the above embodiments can form an embodiment of the present disclosure, and will not be described one by one herein.

Figure 2:
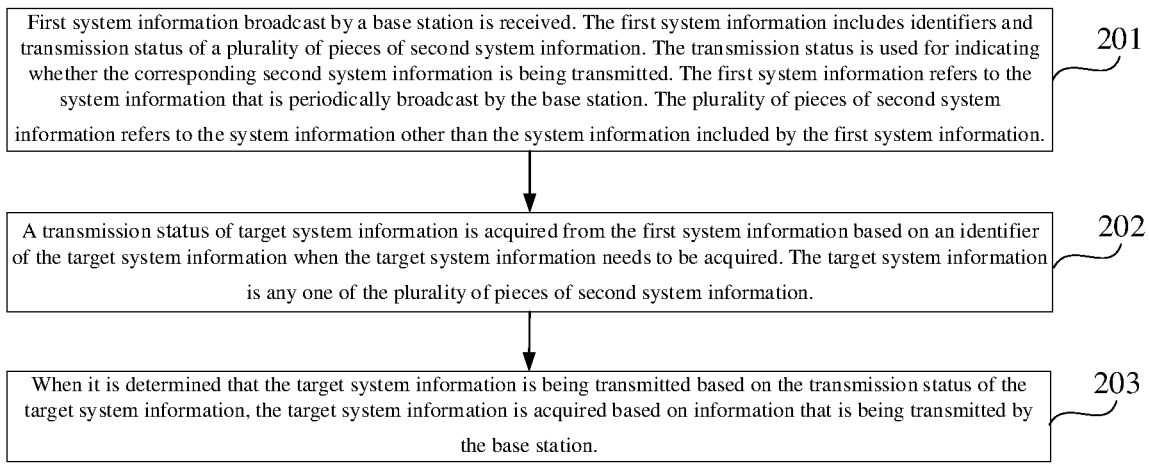
FIG. 2 is a flow chart of a method for transmitting system information according to an exemplary embodiment.

FIG. 2 is a flow chart of a method for transmitting system information according to an exemplary embodiment. As shown in FIG. 2, the method is applied to a terminal and includes the following steps.

In step 201, first system information broadcast by a base station is received. The first system information includes identifiers and transmission status of a plurality of pieces of second system information. The transmission status may be used for indicating whether the corresponding second system information is being transmitted. In one embodiment, the transmission status is used for indicating whether the corresponding second system information is being broadcast. The first system information refers to the system information that is periodically broadcast by the base station. The plurality of pieces of second system information refer to the system information other than the system information included by the first system information.

In step 202, a transmission status of target system information is acquired from the first system information based on an identifier of the target system information when the target system information needs to be acquired. The target system information is any one of the plurality of pieces of second system information.

In step 203, when it is determined that the target system information is being transmitted based on the transmission status of the target system information, the target system information is acquired based on information that is being transmitted by the base station.

In the embodiment of the present disclosure, the terminal can receive the first system information broadcast by the base station. Since the first system information includes the identifiers and the transmission status of the plurality of pieces of second system information supported by the base station, the terminal can acquire the transmission status of the target system information from the first system information when needing to acquire the target system information. The target system information is any one of the plurality of pieces of second system information. If it is determined that the target system information is being transmitted based on the transmission status of the target system information, the target system information can be directly acquired based on the information that is being transmitted by the base station without sending an acquisition request to the base station and the base station does not need to repeatedly send the second system information. Thus, the efficiency of transmitting the system information is improved and the signaling load of the base station is reduced.

In one embodiment, before acquiring the target system information based on the information that is being transmitted by the base station, the method further includes: judging whether the transmission status of the target system information is a first transmission status, wherein the first transmission status may be used for indicating that the target system information is being transmitted; and determining that the target system information is being transmitted when the transmission status of the target system information is the first transmission status.

In one embodiment, acquiring the target system information based on the information that is being transmitted by the base station includes: acquiring a transmission mode of the target system information from the first system information; acquiring a broadcast address of the target system information from the first system information when the transmission mode of the target system information is a broadcast mode; and acquiring the target system information from the information that is being transmitted by the base station based on the broadcast address.

Any combination of the above embodiments can form an embodiment of the present disclosure, and will not be described one by one herein.

Figure 3:
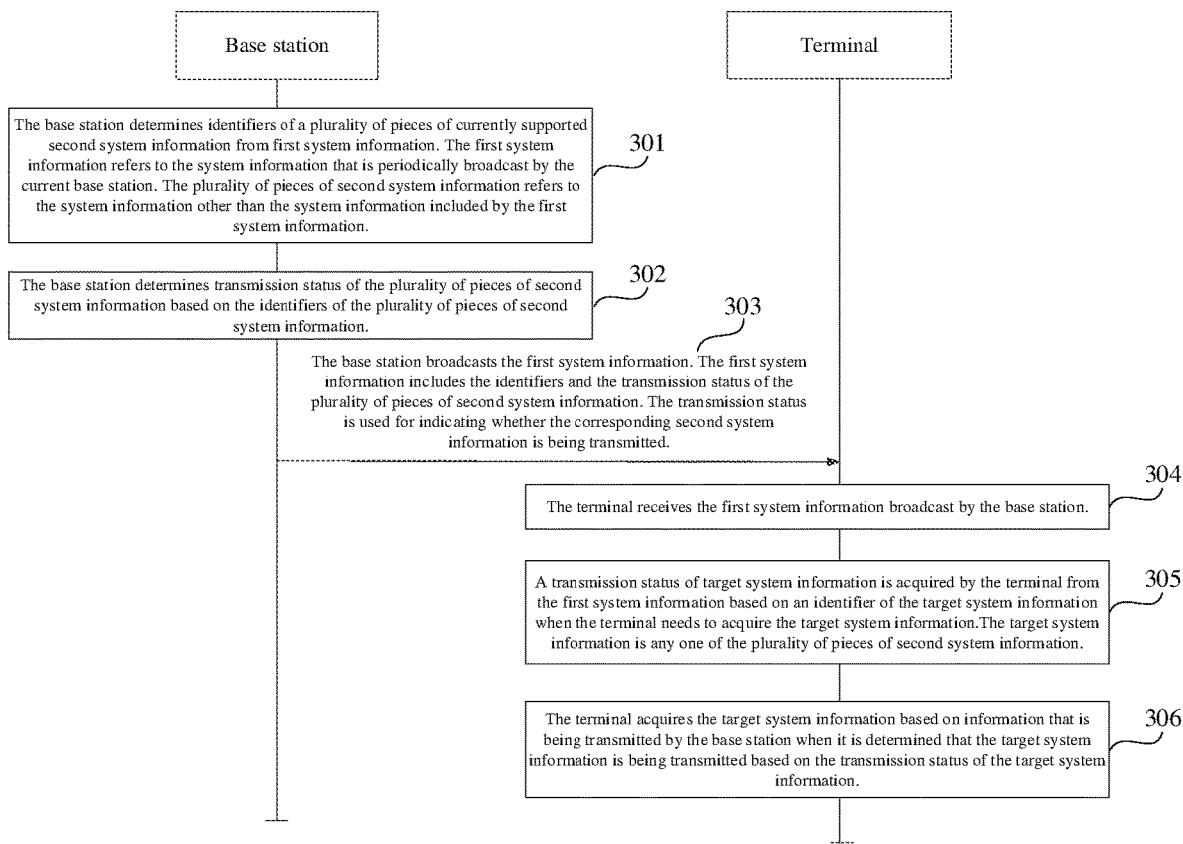
FIG. 3 is a flow chart of a method for transmitting system information according to an exemplary embodiment.

FIG. 3 is a flow chart of a method for transmitting system information according to an exemplary embodiment. For example, the method may be performed by a base station and a terminal, e.g., in a 5 G communication network. As shown in FIG. 3, the method includes the following steps.

In step 301, the base station determines identifiers of a plurality of pieces of currently supported second system information from first system information. The first system information refers to the system information that is periodically broadcast by the current base station. The plurality of pieces of second system information refer to the system information other than the system information included by the first system information. For example, the plurality of pieces of second system information may be the system information that is not included by the first system information.

The first system information can include the identifiers of the plurality of pieces of second system information that is currently supported by the base station, such that the base station can determine the identifiers of the plurality of pieces of second system information from the first system information.

Taking the 5 G communication network as an example, the first system information can be Minimum SI and the second system information can be Other SI. The Minimum SI at least includes cell resource information and identifiers of a plurality of Other SI supported by the base station. The Minimum SI is periodically broadcast by the base station. The Other SI needs to be sent based on a request of the terminal within the management scope of the base station.

In step 302, the base station determines transmission status of the plurality of pieces of second system information based on the identifiers of the plurality of pieces of second system information. The transmission status may be used for indicating whether the corresponding second system information is being transmitted. In one embodiment, the transmission status is used for indicating whether the corresponding second system information is being broadcast.

The base station can determine the plurality of pieces of second system information supported by the base station in accordance with the identifiers of the plurality of pieces of second system information. Further, for each of the plurality of pieces of second system information, whether the second system information is being transmitted is determined. That is, the transmission status of each of the plurality of pieces of second system information is determined.

In step 303, the base station broadcasts the first system information. The first system information includes the identifiers and the transmission status of the plurality of pieces of second system information.

After determining the transmission status of each of the plurality of pieces of second system information, the base station can add the transmission status of each piece of second system information into the broadcast first system information to indicate whether the corresponding second system information is being transmitted.

The base station can periodically broadcast the first system information. A broadcast period of the first system information can be set by the base station by default and can also be set by the negotiation of the base station and the terminal, which will not be limited by the embodiment of the present disclosure.

Further, the transmission status may include a first transmission status and a second transmission status. For example, the first transmission status is used for indicating that the corresponding second system information is being transmitted, and the second transmission status is used for indicating that the corresponding second system information is not being transmitted. Also for example, the first transmission status is used for indicating that the corresponding second system information is being broadcast, and the second transmission status is used for indicating that the corresponding second system information is not being broadcast.

In consideration that some of the plurality of pieces of second system information may be transmitted by the base station and some may not be transmitted by the base station, in order to clearly indicate whether each second system information is being transmitted, the transmission status can include the above-mentioned two transmission status.

In one embodiment, two different status indication identifiers can be adopted to indicate the two transmission status respectively. For example, a first status indication identifier can be adopted to indicate the first transmission status, and a second status indication identifier can be adopted to indicate the second transmission status. For example, the first status indication identifier can be 0 and the second status indication identifier can be 1.

Further, for each of the plurality of pieces of second system information, when the transmission status of the second system information is the first transmission status, the first system information can further include a transmission mode of the second system information. The transmission mode includes a broadcast mode or a unicast mode.

For example, for the second system information that is being transmitted, the base station can further determine the transmission mode of the second system information, so that the second system information is being transmitted by means of broadcast or unicast is determined. And the transmission mode of the second system information can be indicated in the first system information by the base station.

In one embodiment, two different transmission indication identifiers can be adopted to indicate the two transmission modes respectively. For example, a first transmission indication identifier can be adopted to indicate the broadcast mode, and a second transmission indication identifier can be adopted to indicate the unicast mode. For example, the first transmission indication identifier can be 3, and the second transmission indication identifier can be 4.

Further, for each of the plurality of pieces of second system information, when the transmission mode of the second system information is the broadcast mode, the first system information further includes a broadcast address of the second system information.

For example, for the second system information that is being transmitted by means of broadcast, the base station can further determine the broadcast address of the second system information. And the broadcast address of the second system information can be indicated in the first system information by the base station.

The broadcast address is used for indicating a time-frequency resource of the second system information during transmission of the second system information. For example, the broadcast address can include a transmission period of the second system information, sub-frame information or symbol information where the second system information is, and the like.

For example, assuming that the base station supports three second system information, namely Other SI-1, Other SI-2 and Other SI-3, in which Other SI-1 and Other SI-2 are being transmitted, Other SI-3 is not being transmitted, the transmission mode of Other SI-1 is the broadcast mode and the transmission mode of Other SI-2 is the unicast mode. On this basis, the first system information at least includes information as shown in Table 1.

TABLE 1

| Identifiers of the Second System Information | | | |
|---|---|---|---|
| Other SI-1 | Being transmitted | Broadcast | Broadcast address |
| Other SI-2 | Being transmitted | Unicast | |
| Other SI-3 | Not being transmitted | | |

In should be noted that the embodiment of the present disclosure merely illustrates the first system information by taking Table 1 as an example. However, neither the form nor the content of the Table 1 limits the embodiment of the present disclosure. For example, in another embodiment, the first status indication identifier 0 can be adopted to indicate "being transmitted", the second status indication identifier 1 can be adopted to indicate "not being transmitted", the first transmission indication identifier 3 can be adopted to indicate broadcast transmission, and the second transmission indication identifier 4 can be adopted to indicate unicast transmission.

In step 304, the terminal receives the first system information broadcast by the base station.

The terminal within the management scope of the base station can receive the first system information broadcast by the base station.

In step 305, a transmission status of target system information is acquired by the terminal from the first system information based on an identifier of the target system information when the terminal needs to acquire the target system information. The target system information is any one of the plurality of pieces of second system information.

When there is need to acquire the target system information, the terminal can search for the transmission status to which the identifier of the target system information corresponds from the first system information, and determine the transmission status to which the identifier of the target system information corresponds as the transmission status of the target system information. After that, whether the target system information is being transmitted can be judged by the terminal in accordance with the transmission status of the target system information.

In one embodiment, judging whether the target system information is being transmitted in accordance with the transmission status of the target system information includes: judging whether the transmission status of the target system information is the first transmission status; determining that the target system information is being transmitted when the transmission status of the target system information is the first transmission status; and determining that the target system information is not being transmitted when the transmission status of the target system information is the second transmission status.

In step 306, the terminal acquires the target system information based on information that is being transmitted by the base station when it is determined that the target system information is being transmitted based on the transmission status of the target system information.

In one embodiment, acquiring the target system information based on the information that is being transmitted by the base station includes: acquiring a transmission mode of the target system information from the first system information; acquiring a broadcast address of the target system information from the first system information when the transmission mode of the target system information is a broadcast mode;

and acquiring the target system information from the information that is being transmitted by the base station based on the broadcast address.

Further, when it is determined that the target system information is not being transmitted based on the transmission status of the target system information, or when it is determined that the target system information is being transmitted by means of unicast based on the transmission status of the target system information, the terminal can send an acquisition request to the base station. The acquisition request carries an identifier of the target system information and is for requesting the base station to transmit the target system information to the terminal. After receiving the acquisition request, the base station can transmit the target system information to the terminal.

For example, when a certain terminal within the management scope of the base station needs to acquire the target system information, in the plurality of pieces of second system information that can be supported by the base station, some may be being transmitted by the base station, and some may not be being transmitted. In the second system information that is being transmitted, some may be transmitted by means of broadcast, and some may be transmitted by means of unicast, namely, end to end. If the terminal knows the broadcast address of the second system information that is transmitted by means of broadcast, the target system information that is being broadcast by the base station can be received by the terminal based on the broadcast address. Since the second system information that is transmitted by means of unicast is sent by the base station to another terminal end to end but not by means of broadcast, the terminal cannot receive the second system information.

Therefore, when the target system information is not being transmitted, the terminal can acquire the target system information from the base station by sending an acquisition request. When the target system information is being transmitted, the terminal can inquire the transmission mode of the target system information from the first system information. If the transmission mode of the target system information is the broadcast mode, the target system information that is being broadcast by the base station can be directly received by the terminal in accordance with the broadcast address of the target system information. If the transmission mode of the target system information is the unicast mode, the terminal may need to send an acquisition request to the base station to acquire the target system information.

Since the target system information that is being broadcast by the base station is received in accordance with the broadcast address of the target system information, the terminal does not need to send a request to the base station for acquiring the target system information. Thus, the efficiency of transmitting the target system information is improved. Meanwhile, the base station does not need to repeatedly broadcast the target system information, thereby, the signaling load of the base station is reduced.

It should be noted that the embodiment of the present disclosure only takes that the target system information is any one of the plurality of pieces of second system information as an example for explanation. However, in practice, different base stations may support different second system information. The second system information that the terminal needs to acquire may be not in the plurality of pieces of second system information currently supported by the base stations to which the terminal corresponds. Thus, the terminal can determine whether the identifier of the second system information that the terminal needs to acquire exists in the first system information first when needing to acquire the second system information. If yes, steps 305-306 are continuously executed. If not, the steps 305-306 may not be executed and the request for acquiring the target system information may not be sent to the base station.

In the embodiment of the present disclosure, the base station can determine the identifiers of the plurality of pieces of second system information that is currently supported by the base station from the first system information, can still determine the transmission status of the plurality of pieces of second system information based on the identifiers of the plurality of pieces of second system information, and therefore, can broadcast the first system information that includes the identifiers and the transmission status of the plurality of pieces of second system information. The transmission status may be used for indicating whether the corresponding second system information is being transmitted. The first system information refers to the system information that is periodically broadcast by the base station. The second system information refers to the system information other than the system information included by the first system information. Since the first system information includes the transmission status of each second system information, after receiving the system information that is broadcast by the base station, the terminal can determine whether the second system information that needs to be acquired currently is being transmitted based on the first system information. If yes, the second system information can be directly acquired from the information that is being transmitted by the base station without sending an acquisition request to the base station and the base station does not need to repeatedly send the second system information. Thus, the efficiency of transmitting the system information is improved and the signaling load of the base station is reduced.

Figure 4:
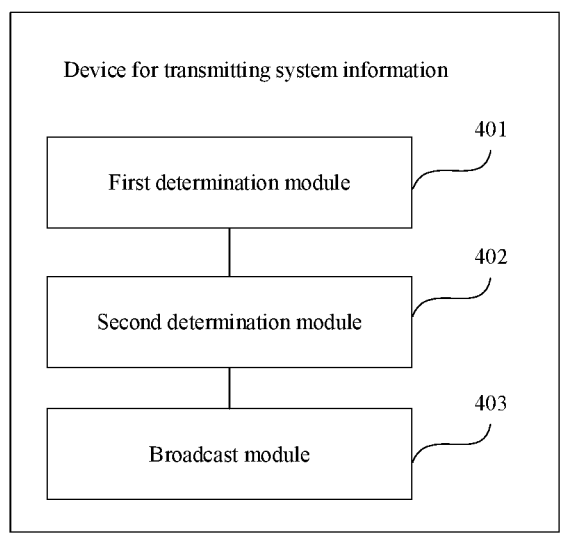
FIG. 4 is a block diagram of a device for transmitting system information according to an exemplary embodiment.

FIG. 4 is a block diagram of a device for transmitting system information according to an exemplary embodiment. The device can be a base station. Referring to FIG. 4, the device includes: a first determination module 401, a second determination module 402, and a broadcast module 403.

The first determination module 401 is configured to determine identifiers of a plurality of pieces of currently supported second system information from first system information, wherein the first system information refers to the system information that is periodically broadcast by the current base station, and the plurality of pieces of second system information refer to the system information other than the system information included by the first system information.

The second determination module 402 is configured to determine transmission status of the plurality of pieces of second system information based on the identifiers of the plurality of pieces of second system information.

The broadcast module 403 is configured to broadcast the first system information, wherein the first system information includes the identifiers and the transmission status of the plurality of pieces of second system information, and the transmission status may be used for indicating whether the corresponding second system information is being transmitted.

In one embodiment, the transmission status includes a first transmission status and a second transmission status. For example, the first transmission status is used for indicating that the corresponding second system information is being transmitted, and the second transmission status is used for indicating that the corresponding second system information is not being transmitted. Also for example, the first transmission status is used for indicating that the corresponding second system information is being broadcast, and the second transmission status is used for indicating that the corresponding second system information is not being broadcast.

In one embodiment, for each of the plurality of pieces of second system information, when the transmission status of the second system information is the first transmission status, the first system information further includes a transmission mode of the second system information. The transmission mode includes a broadcast mode or a unicast mode.

In one embodiment, for each of the plurality of pieces of second system information, when the transmission mode of the second system information is the broadcast mode, the first system information further includes a broadcast address of the second system information.

In the embodiment of the present disclosure, the device can determine the identifiers of the plurality of pieces of currently supported second system information from the first system information, can still determine the transmission status of the plurality of pieces of second system information based on the identifiers of the plurality of pieces of second system information, and therefore, can broadcast the first system information that includes the identifiers and the transmission status of the plurality of pieces of second system information. The transmission status may be used for indicating whether the corresponding second system information is being transmitted. The first system information refers to the system information that is periodically broadcast by the base station. The second system information refers to the system information other than the system information included by the first system information. Since the first system information includes the transmission status of each piece of second system information, after receiving the system information that is broadcast by the base station, a terminal can determine whether the second system information that needs to be acquired at present is being transmitted based on the first system information. If yes, the second system information can be directly acquired from the information that is being transmitted by the base station without sending an acquisition request to the base station and the base station does not need to repeatedly send the second system information. Thus, the efficiency of transmitting the system information is improved and the signaling load of the base station is reduced.

Specific operations the modules perform have already been described in detail in the method embodiments, and therefore, will not be described herein in detail.

Figure 5A:
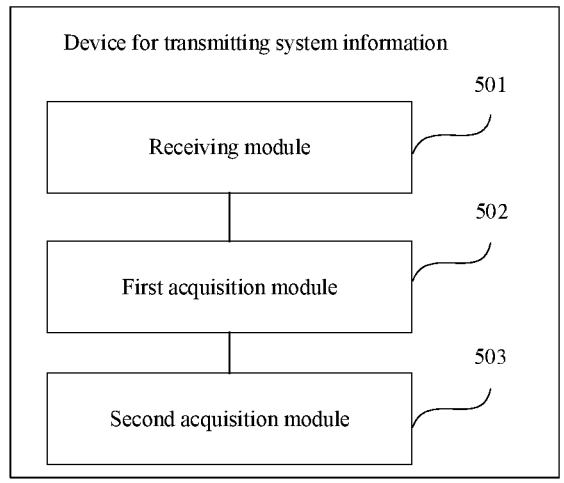
FIG. 5A is a block diagram of a device for transmitting system information according to an exemplary embodiment.

FIG. 5A is a block diagram of a device for transmitting system information according to an exemplary embodiment. The device can be a terminal. Referring to FIG. 5A, the device includes: a receiving module 501, a first acquisition module 502, and a second acquisition module 503.

The receiving module 501 is configured to receive first system information broadcast by a base station, wherein the first system information includes identifiers and transmission status of a plurality of pieces of second system information, wherein the transmission status may be used for indicating whether the corresponding second system information is being transmitted, the first system information refers to the system information that is periodically broadcast by the base station, and the plurality of pieces of second system information refer to the system information other than the system information included by the first system information.

The first acquisition module 502 is configured to acquire a transmission status of target system information from the first system information based on an identifier of the target system information when the target system information needs to be acquired, wherein the target system information is any one of the plurality of pieces of second system information.

The second acquisition module 503 is configured to, when it is determined that the target system information is being transmitted based on the transmission status of the target system information, acquire the target system information based on information that is being transmitted by the base station.

Figure 5B:
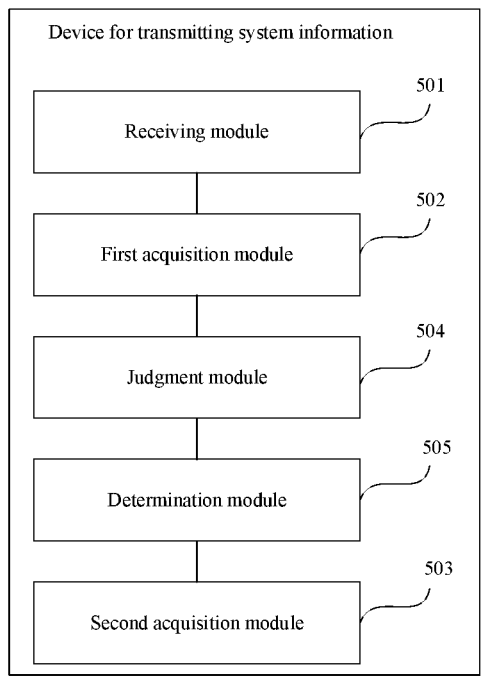
FIG. 5B is a block diagram of a device for transmitting system information according to an exemplary embodiment.

In one embodiment, referring to FIG. 5B, the device further includes: a judgment module 504 configured to judge whether the transmission status of the target system information is a first transmission status, wherein the first transmission status may be used for indicating that the target system information is being transmitted; and a determination module 505 configured to determine that the target system information is being transmitted when the transmission status of the target system information is the first transmission status.

Figure 5C:
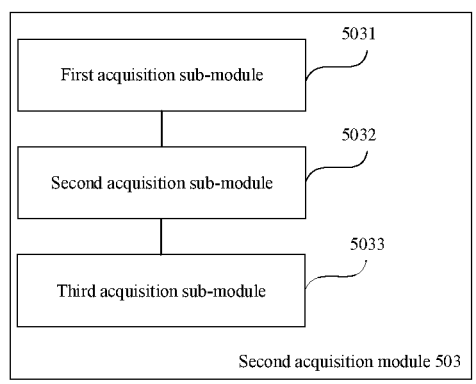
FIG. 5C is a block diagram of an acquisition module according to an exemplary embodiment.

In one embodiment, referring to FIG. 5C, the second acquisition module 503 includes: a first acquisition sub-module 5031 configured to acquire a transmission mode of the target system information from the first system information; a second acquisition sub-module 5032 configured to acquire a broadcast address of the target system information from the first system information when the transmission mode of the target system information is a broadcast mode; and a third acquisition sub-module 5033 configured to, acquire the target system information from the information that is being transmitted by the base station based on the broadcast address.

In the embodiment of the present disclosure, the device can receive the first system information broadcast by the base station. Since the first system information includes the identifiers and the transmission status of the plurality of pieces of second system information supported by the base station, the device can acquire the transmission status of the target system information from the first system information when needing to acquire the target system information. The target system information is any one of the plurality of pieces of second system information. If it is determined that the target system information is being transmitted based on the transmission status of the target system information, the target system information can be directly acquired based on the information that is being transmitted by the base station without sending an acquisition request to the base station and the base station does not need to repeatedly send the second system information. Thus, the efficiency of transmitting the system information is improved and the signaling load of the base station is reduced.

Specific operations the modules perform have already been described in detail in the method embodiments, and therefore, will not be described herein in detail.

Figure 6:
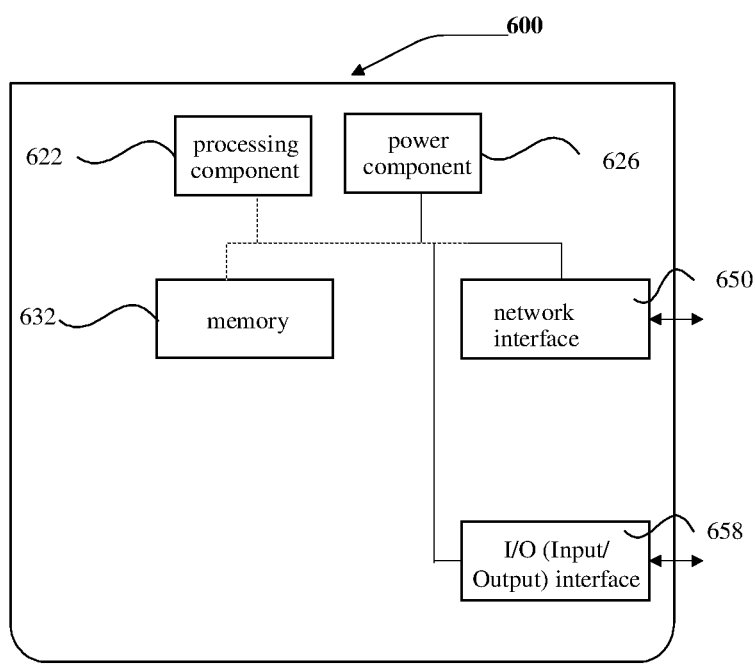
FIG. 6 is a block diagram of a device for transmitting system information according to an exemplary embodiment.

FIG. 6 is a block diagram of a device 600 for transmitting system information according to an exemplary embodiment. For example, the device 600 can be provided as a base station. Referring to FIG. 6, the device 600 includes a processing component 622, as well as a memory resource represented by a memory 632. The processing component 622 further includes one or more processors. The memory resource is configured to store an instruction executable by the processing component 622, for example, an application program. The application program stored in the memory 632 can include one or more modules, each of which corresponds to one instruction. Besides, the processing component 622 is configured to execute the instruction so as to execute the above-mentioned methods.

The device 600 can further include a power component 626 configured to execute power management of the device 600, a wired or wireless network interface 650 configured to connect the device 600 to network, and an I/O (Input/Output) interface 658. The device 600 can operate based on an operation system stored in the memory 632, e.g., Windows Server™, Mac OS X™, Unix™, Linux™, FreeBSD™ or other similar operation systems.

In an exemplary embodiment, there is further provided a non-transitory computer-readable storage medium including an instruction. The device can execute a method for transmitting system information when the instruction in the storage medium is executed by the processor of the device 600. The method includes: determining identifiers of a plurality of pieces of currently supported second system information from first system information, wherein the first system information refers to the system information that is periodically broadcast by a current base station, and the plurality of pieces of second system information refer to the system information other than the system information included by the first system information; determining transmission status of the plurality of pieces of second system information based on the identifiers of the plurality of pieces of second system information; and broadcasting the first system information, wherein the first system information includes the identifiers and the transmission status of the plurality of pieces of second system information, and the transmission status may be used for indicating whether the corresponding second system information is being transmitted.

In one embodiment, the transmission status includes a first transmission status and a second transmission status. For example, the first transmission status is used for indicating that the corresponding second system information is being transmitted, and the second transmission status is used for indicating that the corresponding second system information is not being transmitted. Also for example, the first transmission status is used for indicating that the corresponding second system information is being broadcast, and the second transmission status is used for indicating that the corresponding second system information is not being broadcast.

In one embodiment, for each of the plurality of pieces of second system information, when the transmission status of the second system information is the first transmission status, the first system information further includes a transmission mode of the second system information. The transmission mode includes a broadcast mode or a unicast mode.

In one embodiment, for each of the plurality of pieces of second system information, when the transmission mode of the second system information is the broadcast mode, the first system information further includes a broadcast address of the second system information.

In the embodiment of the present disclosure, the device can determine the identifiers of the plurality of pieces of currently supported second system information from the first system information, can still determine the transmission status of the plurality of pieces of second system information based on the identifiers of the plurality of pieces of second system information, and therefore can broadcast the first system information that includes the identifiers and the transmission status of the plurality of pieces of second system information. The transmission status may be used for indicating whether the corresponding second system information is being transmitted. The first system information refers to the system information that is periodically broadcast by the base station. The second system information refers to the system information other than the system information included by the first system information. Since the first system information includes the transmission status of each second system information, after receiving the system information that is broadcast by the base station, a terminal can determine whether the second system information that needs to be acquired at present is being transmitted based on the first system information. If yes, the second system information can be directly acquired from the information that is being transmitted by the base station without sending an acquisition request to the base station and the base station does not need to repeatedly send the second system information. Thus, the efficiency of transmitting the system information is improved and the signaling load of the base station is reduced.

Figure 7:
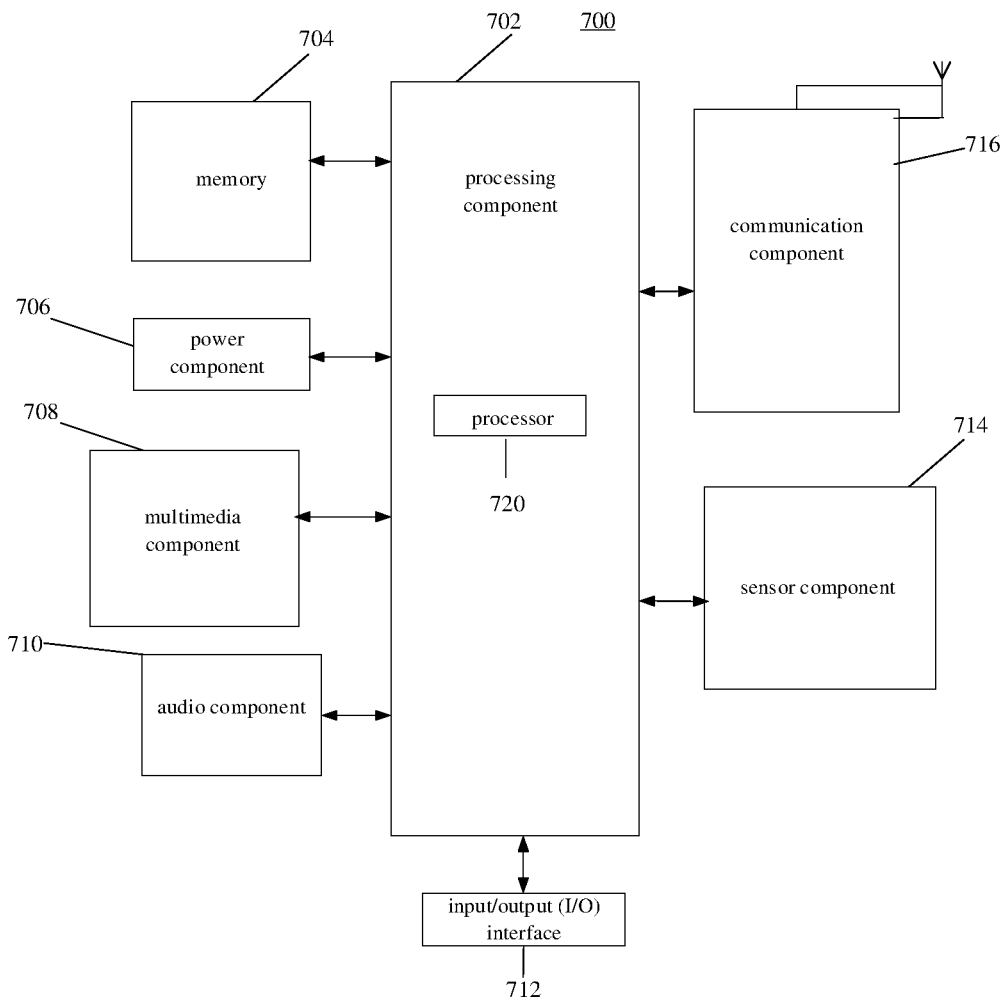
FIG. 7 is a block diagram of a device for transmitting system information according to an exemplary embodiment.

FIG. 7 is a block diagram of a device 700 for transmitting system information according to an exemplary embodiment. For example, the device 700 can be a mobile phone, a computer, a digital broadcast terminal, a messaging device, a gaming console, a tablet device, a medical device, a fitness equipment, a personal digital assistant, and the like.

Referring to FIG. 7, the device 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, videos, etc. The memory 704 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense the duration and pressure associated with the touch or swipe action. In some embodiments, the multimedia component 708 includes a front camera and/or a rear camera. The front camera and the rear camera can receive external multimedia data while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone (MIC) configured to receive external audio signals when the device 700 is in an operation mode, such as a call mode, a recording mode, and a voice recognition mode. The received audio signal can be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons can include, but are not limited to, a home button, a volume button, a start button, and a lock button.

The sensor component 714 includes one or more sensors to provide status assessments of various aspects of the device 700. For instance, the sensor component 714 can detect an on/off status of the apparatus 700, relative positioning of components, e.g., the display device and the mini keyboard of the device 700, and the sensor component 714 can also detect a position change of the device 700 or a component of the device 700, presence or absence of user contact with the device 700, orientation or acceleration/deceleration of the device 700, and temperature change of the device 700. The sensor component 714 can include a proximity sensor configured to detect the presence of nearby objects without any physical contact. The sensor component 714 can also include a light sensor, such as a CMOS or CCD image sensor, used for imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 4G, or 5G, or a combination thereof. In an exemplary embodiment, the communication component 716 receives broadcast signals or broadcast associated information from an external broadcast management system via a broadcast channel. In an exemplary embodiment, the communication component 716 further includes a near field communication (NFC) module to facilitate short-range communications.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 704 including instructions, executable by the processor 720 in the device 700, for performing the above-described methods. For example, the non-transitory computer-readable storage medium can be a ROM, a RAM, a CD-ROM, a magnetic tape, a floppy disc, an optical data storage device, and the like.

A non-transitory computer-readable storage medium, when the instruction in the non-transitory computer-readable storage medium is executed by the processor of the device 700, the device 700 can execute a method for transmitting system information. The method includes: receiving first system information broadcast by a base station, wherein the first system information includes identifiers and transmission status of a plurality of pieces of second system information, wherein the transmission status may be used for indicating whether the corresponding second system information is being transmitted, the first system information refers to the system information that is periodically broadcast by the base station, and the plurality of pieces of second system information refer to the system information other than the system information included by the first system information; acquiring a transmission status of target system information from the first system information based on an identifier of the target system information when the target system information needs to be acquired, wherein the target system information is any one of the plurality of pieces of second system information; and when determining that the target system information is being transmitted based on the transmission status of the target system information, acquiring the target system information based on information that is being transmitted by the base station.

In one embodiment, before acquiring the target system information based on the information that is being transmitted by the base station, the method further includes: judging whether the transmission status of the target system information is a first transmission status, wherein the first transmission status may be used for indicating that the target system information is being transmitted; and determining that the target system information is being transmitted when the transmission status of the target system information is the first transmission status.

In one embodiment, the acquiring the target system information based on the information that is being transmitted by the base station includes: acquiring a transmission mode of the target system information from the first system information; acquiring a broadcast address of the target system information from the first system information when the transmission mode of the target system information is a broadcast mode; and acquiring the target system information from the information that is being transmitted by the base station based on the broadcast address.

In the embodiment of the present disclosure, the device can receive the first system information broadcast by the base station. Since the first system information includes the identifiers and the transmission status of the plurality of pieces of second system information supported by the base station, the device can acquire the transmission status of the target system information from the first system information when needing to acquire the target system information. The target system information is any one of the plurality of pieces of second system information. If it is determined that the target system information is being transmitted based on the transmission status of the target system information, the target system information can be directly acquired based on the information that is being transmitted by the base station without sending an acquisition request to the base station and the base station does not need to repeatedly send the second system information. Thus, the efficiency of transmitting the system information is improved and the signaling load of the base station is reduced.

Other embodiments of the present disclosure can be available to those skilled in the art upon consideration of the specification and practice of the present disclosure disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It should be understood that this disclosure is not limited to the precise constructions described above and shown in the enclosed drawings, and various modifications and changes can be made without departing from the scope thereof. The scope of the present disclosure can be limited only by the appended claims.

What is claimed is:

1. A method for transmitting system information, the method being performed by a base station and comprising:
   determining identifiers of a plurality of pieces of second system information;
   determining a transmission status of the plurality of pieces of second system information based on the identifiers of the plurality of pieces of second system information, wherein the transmission status comprises a first transmission status and a second transmission status, the first transmission status indicates that the corresponding second system information is being broadcast, and the second transmission status indicates that the corresponding second system information is not being broadcast; and
   broadcasting first system information, wherein the first system information includes the identifiers and the transmission status of the plurality of pieces of second system information, wherein the first system information is system information that is periodically broadcast by the base station, and the plurality of pieces of second system information are system information other than the system information included by the first system information.

2. The method according to claim 1, wherein the first transmission status indicates that the corresponding second system information is being broadcast by indicating that the corresponding second system information is being transmitted, and the second transmission status indicates that the corresponding second system information is not being broadcast by indicating that the corresponding second system information is not being transmitted.

3. The method according to claim 2, wherein for each of the plurality of pieces of second system information, when the transmission status of the second system information is the first transmission status, the first system information further comprises a transmission mode of the second system information, wherein the transmission mode is a broadcast mode.

4. The method according to claim 3, wherein for each of the plurality of pieces of second system information, when the transmission mode of the second system information is the broadcast mode, the first system information further comprises a broadcast address of the second system information.

5. A base station, comprising:
a processor; and
a memory storing an instruction executable by the processor,
wherein the processor is configured to:
determine identifiers of a plurality of pieces of second system information;
determine a transmission status of the plurality of pieces of second system information based on the identifiers of the plurality of pieces of second system information, wherein the transmission status comprises a first transmission status and a second transmission status, the first transmission status indicates that the corresponding second system information is being broadcast, and the second transmission status indicates that the corresponding second system information is not being broadcast; and
broadcast first system information, wherein the first system information includes the identifiers and the transmission status of the plurality of pieces of second system information.

6. The base station according to claim 5, wherein the first transmission status indicates that the corresponding second system information is being broadcast by indicating that the corresponding second system information is being transmitted, and that the corresponding second system information is being broadcast by indicating the second transmission status indicates that the corresponding second system information is not being transmitted.

7. The base station according to claim 6, wherein for each of the plurality of pieces of second system information, when the transmission status of the second system information is the first transmission status, the first system information further comprises a transmission mode of the second system information, wherein the transmission mode is a broadcast mode.

8. The base station according to claim 7, wherein for each of the plurality of pieces of second system information, when the transmission mode of the second system information is the broadcast mode, the first system information further comprises a broadcast address of the second system information.

9. A terminal, comprising:
a processor; and
a memory storing an instruction executable by the processor,
wherein the processor is configured to:
receive first system information broadcast by a base station, wherein the first system information includes identifiers and transmission status of a plurality of pieces of second system information, wherein the first system information is system information that is periodically broadcast by the base station, and the plurality of pieces of second system information are system information other than the system information included by the first system information;
acquire a transmission status of target system information from the first system information based on an identifier of the target system information when the target system information needs to be acquired, wherein the target system information is one of the plurality of pieces of second system information, wherein a transmission status of the plurality of pieces of second system information comprises a first transmission status and a second transmission status, the first transmission status indicates that the corresponding second system information is being broadcast, and the second transmission status indicates that the corresponding second system information is not being broadcast; and when it is determined that the target system information is being broadcast based on the transmission status of the target system information, acquire the target system information based on information that is being transmitted by the base station.

10. The terminal according to claim 9, wherein the processor is further configured to:

judge whether the transmission status of the target system information is the first transmission status, wherein the first transmission status indicates that the target system information is being broadcast by indicating that the target system information is being transmitted; and determine that the target system information is being transmitted when the transmission status of the target system information is the first transmission status.

11. The terminal according to claim 8, wherein the processor is further configured to:

acquire a transmission mode of the target system information from the first system information;

acquire a broadcast address of the target system information from the first system information when the transmission mode of the target system information is a broadcast mode; and acquire the target system information from the information that is being transmitted by the base station based on the broadcast address.

* * * * *